Nov. 29, 1955  J. L. BACOT  2,725,043
ROTARY SPHERICAL INTERNAL COMBUSTION ENGINE VALVE
Filed June 25, 1951  2 Sheets-Sheet 1
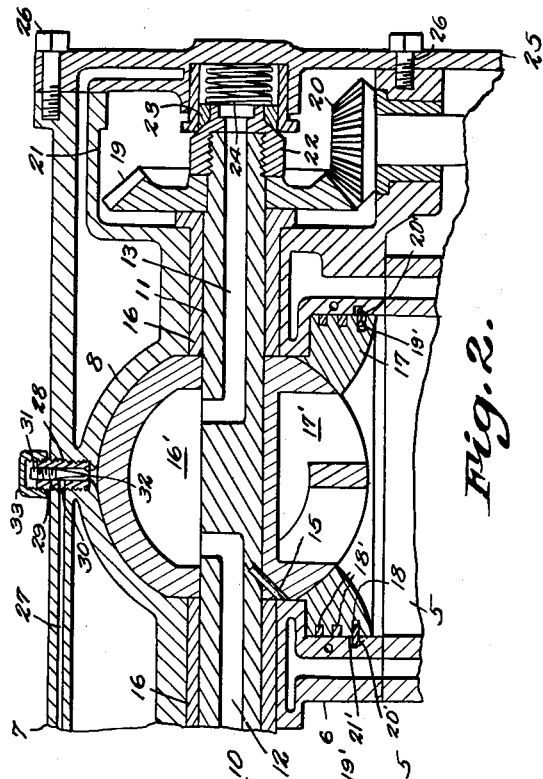
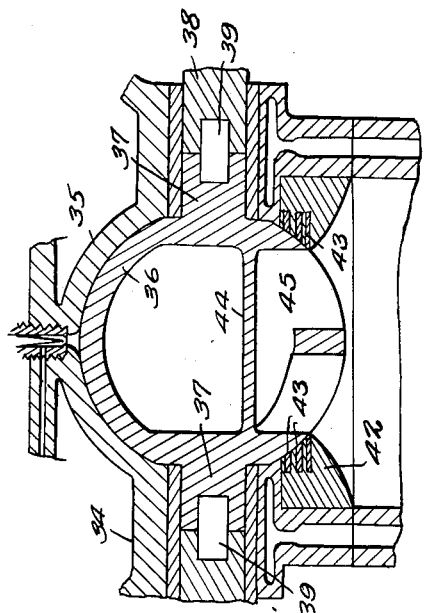
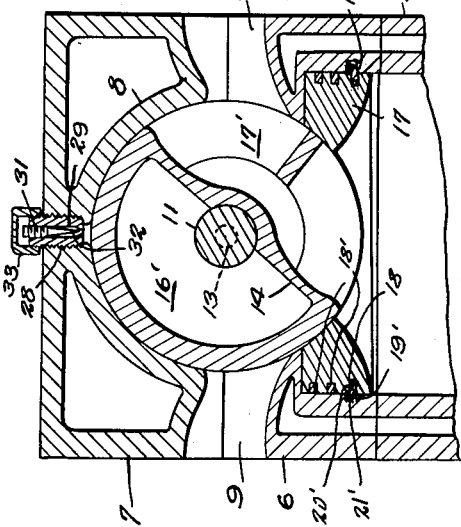
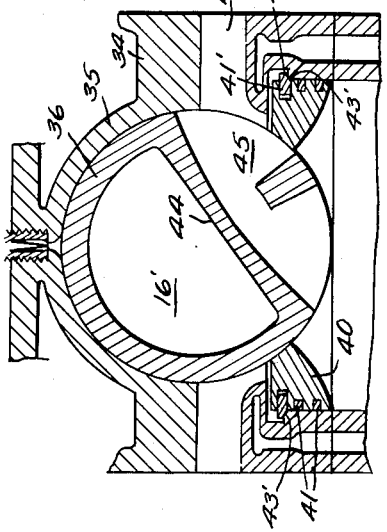
J. L. Bacot
INVENTOR,
BY
ATTORNEYS.

Nov. 29, 1955     J. L. BACOT     2,725,043
ROTARY SPHERICAL INTERNAL COMBUSTION ENGINE VALVE
Filed June 25, 1951     2 Sheets-Sheet 2

J. L. Bacot
INVENTOR,
BY C. A. Snow & Co.
ATTORNEYS.

United States Patent Office 2,725,043
Patented Nov. 29, 1955

2,725,043

ROTARY SPHERICAL INTERNAL COMBUSTION ENGINE VALVE

James L. Bacot, Mobile, Ala.

Application June 25, 1951, Serial No. 233,351

1 Claim. (Cl. 123—41.4)

This invention relates to rotary valve construction designed as internal combustion engine valves, and more particularly to rotary valves of the so-called spherical type, an important object of the invention being to provide a valve which will rotate at exceptionally high speeds, thereby promoting the efficiency of the engine, of which the valve forms a part.

Another object of the invention is to provide a rotary valve assembly of the spherical type, the valves being operated by an operating shaft common to all the valves, shear pins being provided for securing the valves to the power shaft so that if one valve should stick, the valve would be released from the power shaft by the breaking of the shear pin, thereby preventing damage to the remaining valves of the assembly.

Still another object of the invention is to provide a rotary valve wherein sealing rings are employed for providing the necessary seal between the valve and its casing, thereby insuring against the valve freezing or seizing.

Still another object of the invention is to provide a valve which will operate as a combined intake and exhaust valve, the gas or explosive charge passing to the engine operating to maintain the valve cool.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings,

Figure 1 is a sectional view through the upper portion of a cylinder and the cylinder head, illustrating the valve, constructed in accordance with the invention, as mounted therein.

Fig. 2 is a longitudinal sectional view, taken at right angles to Fig. 1.

Fig. 3 is a sectional view through a modified form of the rotary spherical valve.

Fig. 4 is a sectional view through a rotary spherical valve illustrating a fixed type valve seal ring as forming a part of the valve structure.

Figure 5:
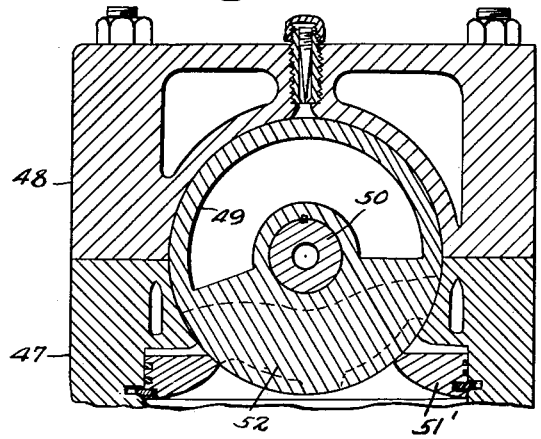
Fig. 5 is a vertical sectional view through a further modified form of the valve and illustrating a wedge-type valve seal ring used in conjunction with the valve.

Referring to the drawings in detail, the reference character 5 indicates a cylinder block, and the reference character 6 indicates the cylinder head, which embodies an upper removable section 7.

The cylinder head is so constructed that it provides the housing for the valves which in the present showing are of substantially spherical shape, the cylinder head being formed with subtantially spherical valve housings 8 in which the valves fit.

As clearly shown by Fig. 1 of the drawings, the cylinder head is provided with intake ports 9 that communicate with the spherical valve housings 8, while at the opposite sides of the spherical valve housings, are exhaust ports 10.

The cylinder head is also provided with a horizontally disposed bore in which the valve drive shaft 11 is mounted, the valve drive shaft 11 being formed with bores 12 and 13 extended longitudinally therethrough, the bores communicating with the interior of the valves so that cooling fluid may be forced therethrough to maintain the valves cool.

As shown, each of these substantially spherical valves is divided by the partition 14 providing a cooling chamber 16' and a valve port 17' which acts as a combined fuel charge inlet port and an exhaust port, as the valve rotates.

Shear pins 15 extend through openings in the spherical valves and valve drive shaft, uniting the spherical valves with the shaft, so that in the event that one valve should become defective and be caused to burn out within its housing, the rotation of the valve drive shaft will shear the pin and thereby prevent damage to the remaining valves mounted on the valve drive shaft.

The reference character 16 indicates bronze bearings that support the valve drive shaft.

Mounted within the lower section of the cylinder head, is the seal ring 17 that is held within the lower section of the head by means of rings 18 and 18', which rings also prevent gas from escaping between the seal rings and cylinder wall.

As shown, the rings 18 are beveled at 19' and move over the beveled edges 20' of the ring grooves 21', in which the rings 18 move, the expansion of the rings 18 in their grooves resulting in the rings 17 and 18 moving upwardly providing a close fit between the seal rings 17 and valves operating thereagainst.

Secured to one end of the valve drive shaft 11, is the beveled gear 19 which meshes with the beveled drive gear 20 that extends upwardly through an opening at one end of the enlarged portion 21 of the cylinder head, the enlarged portion forming a housing for the beveled gear 19 and drive gear 20.

As clearly shown by Fig. 2 of the drawings, one end of the valve drive shaft 11 is formed with threads over which the beveled nut 22 is positioned, the beveled nut cooperating with the carbon or bronze beveled seal member 23 which is pressed against the beveled portion of the beveled nut by means of the coiled spring 24, thereby sealing the bore of the drive shaft against cooling fluid passing therethrough into the housing in which the beveled gear 19 and beveled drive gear 20 are mounted.

The housing at one end of the cylinder head, is closed by means of the plate 25 which is held in position by means of the bolts 26 that are shown as passing through openings in the plate 25 and embedded in threaded openings formed in the cylinder head.

The removable section 7 of the cylinder head is provided with the passageway 27 formed in the upper wall thereof, the passageway 27 being in communication with the various valve housings, through the threaded openings 28 in which the threaded valve tubes 29 are located, the tubes 29 being formed with lateral openings 30 that communicate with the bore 27 to allow lubricating fluid to pass into the tubes 29. Operating within the tubes 29 are plug valves 31, that have tapered ends 32, the plug valves controlling the passage of lubricating material to the valve housings to maintain the valves lubricated at all times. Caps 33 are fitted over the valve tubes 29 normally protecting the needle adjusting valves. In the valve construction as shown by Figs. 3 and 4 of the drawings, the cylinder head is indicated by the reference character 34 and is provided with a plurality of valve housings 35 in which the substantially spherical valves 36 operate, the valves 36 having stub shafts 37 extending therefrom, the stub shafts being connected to the valve drive shafts 38 through the medium of the shear keys 39.

As shown by Fig. 3 of the drawings, the seal ring 40 is fitted within the cylinder head and is provided with sealing rings 41 and 41' that provide a fluid-tight connection between the wall of the opening formed in the cylinder head, and curved surface of the substantially spherical valve, associated therewith, the seal ring 41' being beveled at 42' to move over the beveled edge 43' of the ring groove causing the seal ring 40 to move upwardly under pressure in the cylinder 5 of the engine. The seal rings 40 are so constructed that they will be forced into close contact with the valve associated therewith, under pressure directed thereto from the cylinder directly thereunder, the beveled construction of the rings 41' also contributing to this movement of the seal rings 40.

The sealing ring as shown by Fig. 4 of the drawings is indicated by the reference character 42, and in this form of the invention the ring 42 is provided with a series of grooves in which the rings 43 are held, the rings 43 contacting with the outer surface of the substantially spherical valve associated therewith, providing a fluid-tight connection between the ring 42 and its valve.

The spherical valve is divided by the partition 44 which divides one section of the substantially spherical valve into an intake and an exhaust port so arranged that the intake port shown at 45 will also act as an exhaust port when the valve reaches a position opposite to the exhaust passageway 46 of the cylinder head.

In the construction of the valve as shown by Fig. 5 of the drawings, the upper end of the engine cylinder is indicated by the reference character 47, and the reference character 48 indicates the cylinder head which is provided with the usual valve opening, the valve opening housing the valve 49 which is substantially spherical in construction, the valve being shown as secured to the shaft 50 for rotating the valve.

The shaft 50 is hollow and is provided with outlets 51 so that cooling fluid may be circulated through the valve to maintain the valve cool.

The sealing ring in this form of the invention is indicated by the reference character 51' and is shown as contacting with the valve providing a fluid-tight connection.

Figure 6:
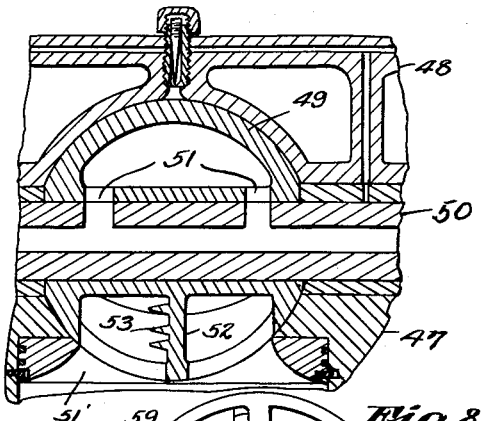
Fig. 6 is a sectional view taken at right angles to Fig. 5.
Figure 7:
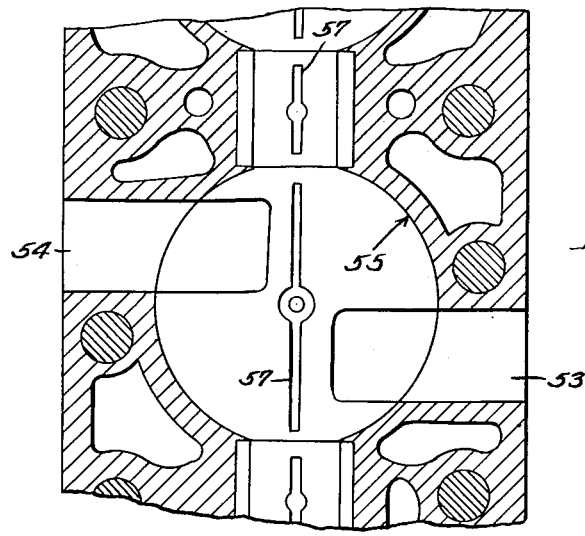
Fig. 7 is a horizontal sectional view through the cylinder head illustrating a further modified form of the invention.

As shown by Fig. 6 of the drawings, the spherical valve is provided with a curved partition 52 to which the laterally extended fins 53 are secured, the fins increasing the cooling surface to further maintain the valve cool. In Fig. 7 of the drawings, the exhaust port is indicated by the reference character 53', while the intake port is indicated by the reference character 54. A valve housing is indicated by the reference character 55 and is provided with an intake port 54 which is so constructed and arranged that as a valve rotates therein, one inlet opening of the valve will register with the intake port 54 so that a fuel charge may enter the valve which upon further rotation moves to a position where the charge will be fired and then exhausted through the port 53.

Figure 8:
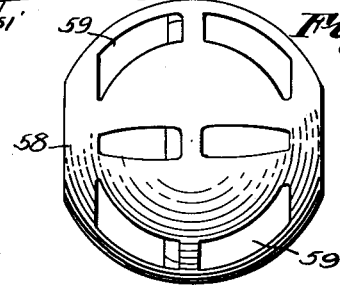
Fig. 8 is an elevational view of a spherical valve illustrating spaced intake and exhaust ports of the valve.

Grooves 57 are provided in the inner surfaces of the valve housings as well as in the bronze bearings of the shaft connecting adjacent valves, which grooves accommodate lubricating material for lubricating the valve and valve shaft. In Fig. 8, a substantially spherical valve is shown and indicated by the reference character 58, the valve having an intake port 59 and exhaust port 59' which are so arranged that as the valve rotates, the intake port will register with an intake pipe for supplying fuel charges to the engine cylinder with which the valve is associated. Upon further rotation of the valve, the exhaust port 59' moves to a position opposite to the intake port of the engine, where the exhaust gases pass from the cylinder.

Figure 9:
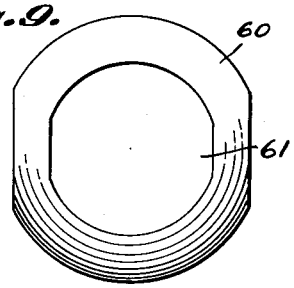
Fig. 9 is a view illustrating a further modified form of the spherical valve.

A still further modified form of valve is shown by Fig. 9 of the drawings, the valve being indicated by the numeral 60 and formed with cut out portions 61 that provide a combination intake port and exhaust port.

Figure 11:
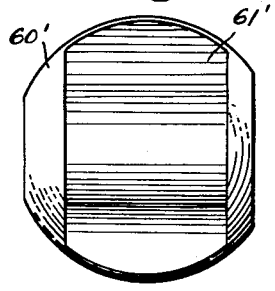
Fig. 11 is an elevational view of another modified form of valve.
Figure 12:
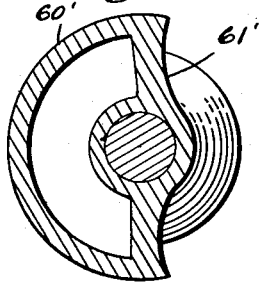
Fig. 12 is a vertical sectional view through the valve structure as shown by Fig. 11.

The valve shown by Fig. 11 of the drawing is a further modified form of the invention and is of semispherical construction, the valve being indicated by the numeral 60' and provided with a substantially straight wall 61' which wall provides a port for the intake or fuel charge, while upon further rotation of the valve, the opening will register with the exhaust port of the engine with which the valve is used exhausting the exhaust gases from the cylinder.

Figure 10:
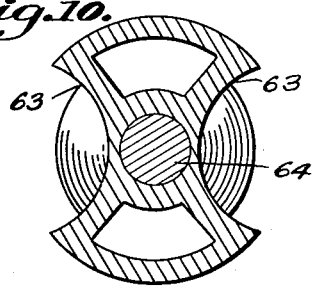
Fig. 10 is a sectional view through a still further form of the invention.

As shown by Fig. 10, the side wall of the valve is cut away at opposite sides, providing intake ports 63, the valve being mounted on the valve shaft 64, so that the valve may be rotated by the pinions of an internal combustion engine in the usual manner.

From the foregoing it will be seen that due to the construction shown and described, I have provided a substantially spherical valve for internal combustion engines wherein the intake port of the valve is so constructed and arranged that the fuel charge may enter the valve through the intake port and be carried to the cylinder where it is fired, the valve continuing on its rotation to align with the exhaust port of the engine to permit the exhaust gases to pass therefrom through said port of the valve.

It might be further stated that it is contemplated to mount a plurality of these valves on a single shaft for simultaneous operation.

Having thus described the invention, what is claimed is:

The combination with the cylinder of an internal combustion engine having a cylinder head formed with intake and exhaust ports, of a rotary valve comprising a substantially spherical valve housing formed in the cylinder head, having ports communicating with said intake and exhaust ports, a shaft having a bore formed along the longitudinal axis thereof, and having outlet openings communicating with said bore a substantially spherical valve secured on the shaft to move therewith, operating in the valve housing, a partition in said valve dividing the valve into a cooling chamber and intake and exhaust ports, said cooling chamber having inlet and outlet ports providing communication between said cooling chamber and outlet openings of said shaft through which cooling fluid is directed to the cooling chamber, cooling said valve and shaft, and means for rotating said valve whereby said intake and exhaust ports of the valve register successively with said intake and exhaust ports of the cylinder head providing a combined intake and exhaust valve.

References Cited in the file of this patent

UNITED STATES PATENTS

| | | |
|---|---|---|
| 1,087,499 | Lane | Feb. 17, 1914 |
| 1,163,858 | Roberts et al. | Dec. 14, 1915 |
| 1,181,974 | Blye | May 2, 1916 |
| 1,252,753 | Wehr | Jan. 8, 1918 |
| 1,383,075 | Clark | June 28, 1921 |
| 1,775,581 | Baer | Sept. 3, 1930 |
| 1,863,301 | Zeeman | July 19, 1932 |
| 1,977,025 | Van der Elst et al. | Oct. 16, 1934 |
| 2,048,134 | Montalto | July 21, 1936 |